July 9, 1968     J. FEINSTEIN     3,392,292
MASS FLOW GAS GENERATOR

Filed April 8, 1965     2 Sheets-Sheet 1

INVENTOR.
JOSEPH FEINSTEIN
BY Wm J. Nolan
ATTORNEY

July 9, 1968  J. FEINSTEIN  3,392,292
MASS FLOW GAS GENERATOR

Filed April 8, 1965  2 Sheets-Sheet 2

INVENTOR.
JOSEPH FEINSTEIN
BY
ATTORNEY

United States Patent Office

3,392,292
Patented July 9, 1968

3,392,292
MASS FLOW GAS GENERATOR
Joseph Feinstein, Menlo Park, Calif., assignor to Varian Associates, Palo Alto, Calif., a corporation of California
Filed Apr. 8, 1965, Ser. No. 446,573
21 Claims. (Cl. 310—11)

ABSTRACT OF THE DISCLOSURE

An A.C. power generator is disclosed. The generator includes a source for producing a stream of high velocity electrically conductive fluid. The conductive fluid is directed through a duct. An electrode structure associated with the duct forms an electromagnetic wave supportive structure for producing interaction between the electric fields of wave energy traveling on the electrode structure and the high velocity electrically conductive fluid stream so as to cause modulation and charge separation of the fluid stream. The modulated high velocity fluid stream delivers A.C. energy to an output circuit.

---

This invention relates generally to an A.C. power generator and more particularly to a mass flow gas generator for directly converting into electricity the kinetic energy of a high velocity gas stream.

High density energy is readily available in chemical form as, for example, in liquid or solid fuels. Many types of apparatus have been developed for converting such chemical energy into more convenient electrical energy. Most of these first convert the chemical energy into heat energy by combustion of the fuel and subsequently into kinetic energy by expanding the hot combustion gases through a nozzle to form a hydrodynamic flow. Typically, the high velocity gas flow is then utilized in a turbine to drive a rotating electrical generator. The sizable disadvantages, such as excessive size and weight, of rotating electrical power machinery have led to a search for more desirable conversion systems.

One relatively new development is the magnetohydrodynamic generator (MHD). Basically the MHD generator produces electric power by applying a magnetic field to a high velocity, electrically conductive gas flow obtained from a suitable high temperature, high pressure source. The movement of the conductive fluid relative to the applied magnetic field induces an electromotive force between opposed electrodes positioned within the generator. The direct current produced is then available as electrical power.

The many practical difficulties encountered with the MHD generator have resulted from the severe inherent operating requirements of the device. These include the high magnetic field necessary for effective charge separation, the high temperature and alkali atom seeding needed for effective ionization, the thermionic emission from the positive electrode needed to support current flow, the segmented electrodes needed to counteract the transverse Hall effect, etc. In addition, the output of the MHD generator is in the form of direct rather than the more convenient alternating current which permits simple voltage transformation.

Several recent innovations have ensued from attempts to overcome the substantial practical difficulties mentioned above. For example, the use of non-equilibrium ionization has been considered as a possible alleviative to the high temperature requirement. However, the high recombination rate associated with the high electron density necessary to achieve desired conductivity tends to rapidly extinguish ionization.

MHD generator devices have also been suggested for directly converting the kinetic energy of a hydrodynamic gas flow into A.C. energy. Most have entailed the use of an electrical output coil surrounding the path of the hydrodynamic gas stream. However these devices present in addition to many of the above difficulties the problem of creating charge separation necessary for inducing current in the extractor coil.

The object of this invention therefore is to provide an improved apparatus for directly converting into electrical energy the kinetic energy of a hydrodynamic gas flow.

One feature of this invention is the provision of a mass flow gas generator wherein a hydrodynamic gas stream is continuously velocity modulated over an elongated path producing effective charge separation of the stream in a longitudinal direction and a resultant A.C. current.

Another feature of this invention is the provision of a mass flow gas generator of the above featured type wherein the continuous modulation is established by an electric field wave traveling longitudinally within a duct enclosing the path of the hydrodynamic gas stream.

Another feature of this invention is the provision of a mass flow gas generator of the above featured types wherein the electric field is applied by an interdigital electrode array which exhibits a high effective circuit impedance thereby reducing the required level of hydrodynamic gas stream conductivity for a given power output.

Another feature of this invention is the provision of a mass flow gas generator of the above featured types wherein the electrical characteristics of the interdigital electrode array and a connected lumped inductance are such as to form a circuit in parallel resonance at a frequency slightly less than the anticipated velocity of the hydrodynamic gas stream divided by the separation between alternate electrodes thereby establishing a power generating synchronous interaction between the gas stream and the traveling electric field.

Another feature of this invention is the provision of a mass flow gas generator of the above featured types wherein each individual electrode of the interdigital electrode array has an effective inner radius which is less than the longitudinal distance to an adjacent electrode thereby insuring a sufficient electric field strength across the entire cross-section of the hydrodynamic gas stream.

Another feature of this invention is the provision of a mass flow gas generator of the above featured types wherein the spacing between adjacent electrodes decreases in the intended flow direction of the hydrodynamic gas stream thereby compensating for the interaction produced retardation of the gas stream and maintaining synchronous interaction over the entire flow path.

Another feature of this invention is the provision of a mass flow gas generator of the next above featured types wherein the duct enclosing the gas flow path is of increasing cross-section in the intended direction of gas flow thereby compensating for the interaction produced retardation of the gas stream and maintaining synchronous interaction on the entire flow path.

Another feature of this invention is the provision of a mass flow gas generator of the above featured types wherein circular electrodes include inward radial projections which reduce their effective inner radius and insure the application of a sufficient electric field strength across the entire cross-section of the hydrodynamic gas stream.

Another feature of this invention is the provision of a mass flow gas generator which utilizes a rectangular duct and rectangular electrodes, thereby affording a large cross-section but without any decoupling from the electrodes.

These and other objects and features of the present invention will become apparent upon a perusal of the following specification taken in conjunction with the accompanying drawings wherein.

Figure 1:
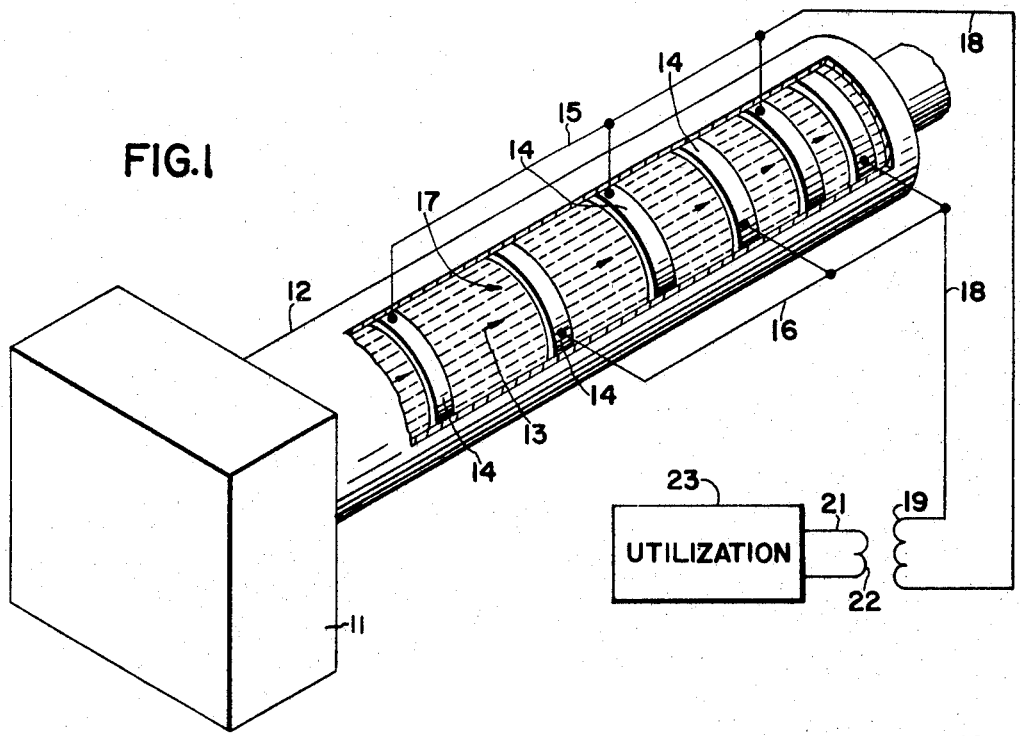
FIG. 1 is a schematic drawing, partly in cross-section, showing a preferred embodiment of the invention.

FIG. 1 shows a gas source 11 connected for gas communication with the elongated duct 12 made of, for example, ceramic material. The gas source 11 is conventional and typically includes a gas heating chamber (not shown) and a gas nozzle (not shown) for directing a high velocity, electrically conductive gas stream 13 longitudinally through the passageway formed by the elongated duct 12. The fluid stream 13 may comprise an ionically conducting gas, such as dissolved salt in steam, as well as an alkali metal seeded fluid, by way of example. A traveling wave structure is formed by the plurality of spaced circular electrodes 14 attached to or formed on the inner surface of the duct 12 so as to surround the longitudinal path of the gas stream 13. The electrical conductor 15 connects one set of alternate electrodes 14 and the electrical conductor 16 connects the other alternate set to form an interdigital electrode array 17. Electrical leads 18 connect the primary winding 19 in parallel with the electrode array 17 and the output leads 21 connect the secondary winding 22 to the A.C. load 23.

During operation a suitable gas, such as helium or argon, is heated in the gas source 11 and expanded through a nozzle (not shown) into the elongated duct 12. Alternatively the combustion product of a fuel can be exhausted through the nozzle (not shown) into the elongated duct 12. In either case, some of the thermal energy content of the hot gas is converted into the kinetic energy of a high velocity gas stream 13 during expansion of the gas through the nozzle. While in the nozzle, ionization of the gas stream at a preferred rate of about 1 in $10^6$ is induced by, for example, seeding with low ionizing atoms such as potassium or sodium or by the application of a corona discharge. Alternatively an ionically conductive substance, such as salt, can be added to a working fluid such as steam.

Figure 3:
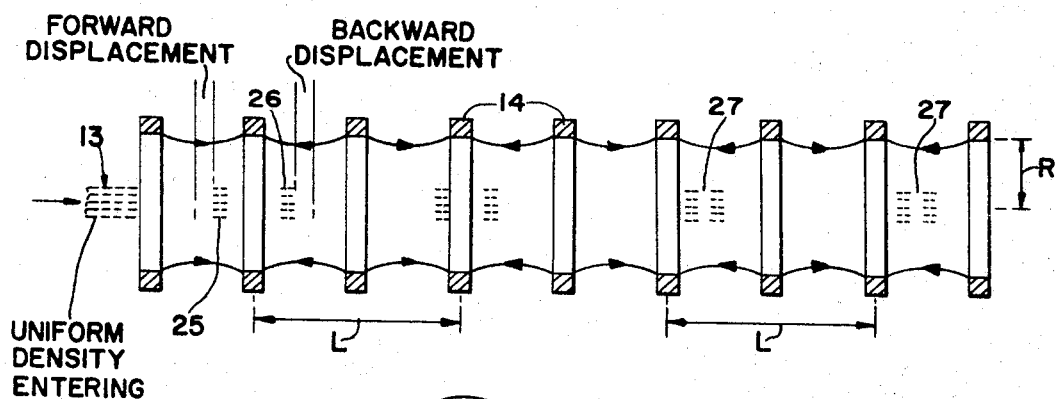
FIG. 3 is a partial schematic drawing illustrating the mode of operation for the invention.

As shown in FIG. 3 the high velocity, ionized gas stream 13 of initially uniform charge density enters the passageway encircled by the electrodes 14. Here the gas stream is subjected to an electric field alternating at the resonant frequency ($f$) of the parallel circuit formed by the electrode array 17 and the lumped inductance of primary winding circuit 18, 19. The circuit values are selected to obtain a resonant frequency ($f$), in cycles per second, which is substantially equal to the velocity $u_0$, in feet per second, of the gas stream 13 divided by the distance (L), in feet, between alternate electrodes 14. This results in the direction of the electric field between adjacent electrodes 14 reversing in time phase with the motion of the gas stream 13 so that each segment of the stream is continuously subjected to the same direction of electric field along the entire length of the elongated duct 12. Accordingly, some electron and/or ion charge segments 25 of the gas stream are under the constant influence of a positive electric field so as to be forwardly displaced while other charge segments 26 are under the constant influence of a negative electric field so as to be backwardly displaced. This continuous displacement along the entire passageway causes a gradual meeting of the different charge sements 25, 26 and formation of the electron and/or ion bunches 27 having an excess of negative charge.

The continuous velocity modulation provided by the traveling wave electrode array 17 is a particularly important feature of this invention. Because of the significant randomizing effects of particle collision and diffusion many conventional charge separation methods such as the well known coasting or drift bunching action which occurs in klystron tubes are relatively ineffective in a dense mass flow media. However by providing continuous velocity modulation the collision and diffusion effects can be overcome and effective charge separation obtained.

In practice the circuit characteristics of the electrode array 17 and the primary winding circuits 18, 19 are selected to provide a resonant frequency F which is slightly less than $u_0/L$ resulting in a traveling electric field wave having a velocity slightly less than that of the electron bunches 27. Thus the charge bunches 27 continuously encounter a retarding field producing the familiar interaction wherein the kinetic energy of the moving charge is transformed into A.C. energy which is induced into the circuit of the electrode array 17. This energy is subsequently delivered via windings 18, 22 and output leads 21 to the load device 23.

The interaction between the charge bunches 27 and the traveling electric wave continually reduces the velocity of the gas stream 13. Ultimately, the slowing phenomenon could destroy synchronism between the stream and the traveling electric field. The gas flow generator shown in FIG. 1 eliminates this possibility by having an electrode spacing L/2 which decreases in the flow direction of the gas stream 13. The lessening of electrode spacing L/2 compensates for the reducing gas stream velocity $u_0$ and permits the maintenance of a relatively constant value for $u_0/L$. In this way synchronism and interaction between the gas stream 13 and the traveling electric field can be maintained over the entire length of the elongated duct 12. Conversion efficiencies in the order of 60% are obtainable with a structure of this kind in high vacuum traveling wave tubes.

Following is a mathematical analysis of the gain which can be expected with the device shown in FIG. 1.

There are three sources of A.C. current density J in the gas stream 13:

$$J = \rho_0 u + u_0 \rho - D \frac{d\rho}{dz} \quad (1)$$

where:

the A.C. velocity $u = \mu E$, $\mu$ = mobility, $E$ = A.C. electric field $\rho$ = A.C. charge density
$\rho_0, u_0$ = mass flow charge density and velocity
$D$ = diffusion coefficient, and
$z$ is distance measured along the stream.

The last term represents the effect of diffusion which acts to reduce any concentration of charge.

A second equation expresses the conservation of charge:

$$\frac{dJ}{dz} + \frac{d\rho}{dt} = 0 \quad (2)$$

The usual small signal assumption is that all A.C. quantities vary as $$\exp[-j\beta z + jwt]$$

so that $$d/dz = -j\beta \quad (3)$$

In addition, the derivation is restricted to one type of charge, normally the electrons in the stream 13 because of their higher mobility, although one should note that there are conditions under which the lower diffusion rate of the ions may result in their contributing substantially to the interaction. In the case of ionic conductivity, the appropriate mobility of the ions is employed in the equations.

The effect of the current upon the circuit wave is to augment the power by:

$$dP = -J.E.dz \quad (4)$$

where the power density P flowing in the circuit is related to the electric field by the usual impedance relation:

$$P = \frac{E^2}{2\beta_k^2 Z} \quad (5)$$

Z is an impedance per unit cross-sectional area, and $\beta_k$ is the phase shift per unit distance (radians/meter) along the circuit.

For the interdigital electrode array 17 which is characterized by a voltage V between adjacent electrodes, the traveling wave is given by:

$$V = V_m \sin \beta_k z; \quad P = \frac{V_m^2}{2Z} \quad (6)$$

$$E = \frac{dV}{dz} = V_m \beta_k \cos \beta_k z$$

Differentiating Equation 5 and combining with Equation 4, results in the following equation:

$$\frac{dE}{dz} = -\beta_k^2 \cdot Z \cdot J \quad (7)$$

Making the substitution called for by Equation 3, and combining Equations 1, 2, and 7 leads to the dispersion relation for the system:

$$\beta^3 - j\beta^2 \beta_d + j\beta\beta_e\beta_d - \beta_k^2 \beta_e \beta_d \cdot \sigma \cdot Z = 0 \quad (8)$$

where $\sigma = \mu \rho_0$, the conductivity of the stream $$\beta_e = \frac{\omega}{u_o}, \quad \beta_d = \frac{u_o}{D}, \quad D = \frac{vt^2}{v_c} = \frac{\text{RMS thermal velocity}}{\text{collision rate}}$$

A perturbation solution to this dispersion equation, valid for small gain/radian of phase distance, is attained by setting:

$$\beta = \beta_e + \sigma \quad (9)$$

and neglecting terms above quadratic in $\delta$. This yields the solution:

$$\delta = -\frac{\beta_e}{2} \pm \sqrt{\left(\frac{\beta_e}{2}\right)^2 - \frac{\beta_e^3 - \beta_k^2 \beta_e \beta_d \cdot \sigma \cdot Z}{3\beta_e - j\beta_d}} \quad (10)$$

For gain to exist, one needs:

$$\beta_k^2 \beta_d \sigma Z > \beta_e^2 \quad (11)$$

Simple expression for the gain may be written in two limiting cases.

When diffusion is small ($\beta_d \gg \beta_e$):

$$\text{Gain} \simeq \exp z \left[ \beta_k^2 \sigma Z - \frac{\beta_e^2}{\beta_d} \right] \quad (12)$$

When diffusion is dominant ($\beta_e \gg \beta_d$):

$$\text{Gain} \simeq \exp \frac{\beta d}{9} z \left[ \frac{\beta k^2}{\beta_e^2} \beta_d \sigma Z - 1 \right]$$

When gain exists, oscillation will build up in the resonated circuit to a power level limited either by large signal departure of the stream 13 from synchronism or by voltage breakdown between the electrodes 14.

It will be noted that in all cases, the product of stream conductivity $\sigma$ and resonant circuit impedance Z enters into the gain. The circuit impedance is given by the product of characteristic impedance ($1/\omega C$ per unit area) and loaded Q. The relatively high values of circuit impedance Z which are attainable with the structure of the present invention permit a substantial reduction in the required value of stream conductivity. Since the propagation constance on circuit and stream are approximately equal ($\beta_k \sim \beta_e$), Equation 11 reduces to $\beta_d \sigma Z > 1$. For a typical stream $\beta_d \sim 100$, while $Z \sim 100$ for a low frequency circuit. Thus the required value of stream conductivity $\sigma > 10^{-4}$ mho/meter.

For an improved oscillation build up, a stream conductivity value about an order of magnitude higher would be desirable. Even such an increase results in a stream conductivity value which is several orders of magnitude below typical MHD generator stream conductivity requirements.

Figure 2:
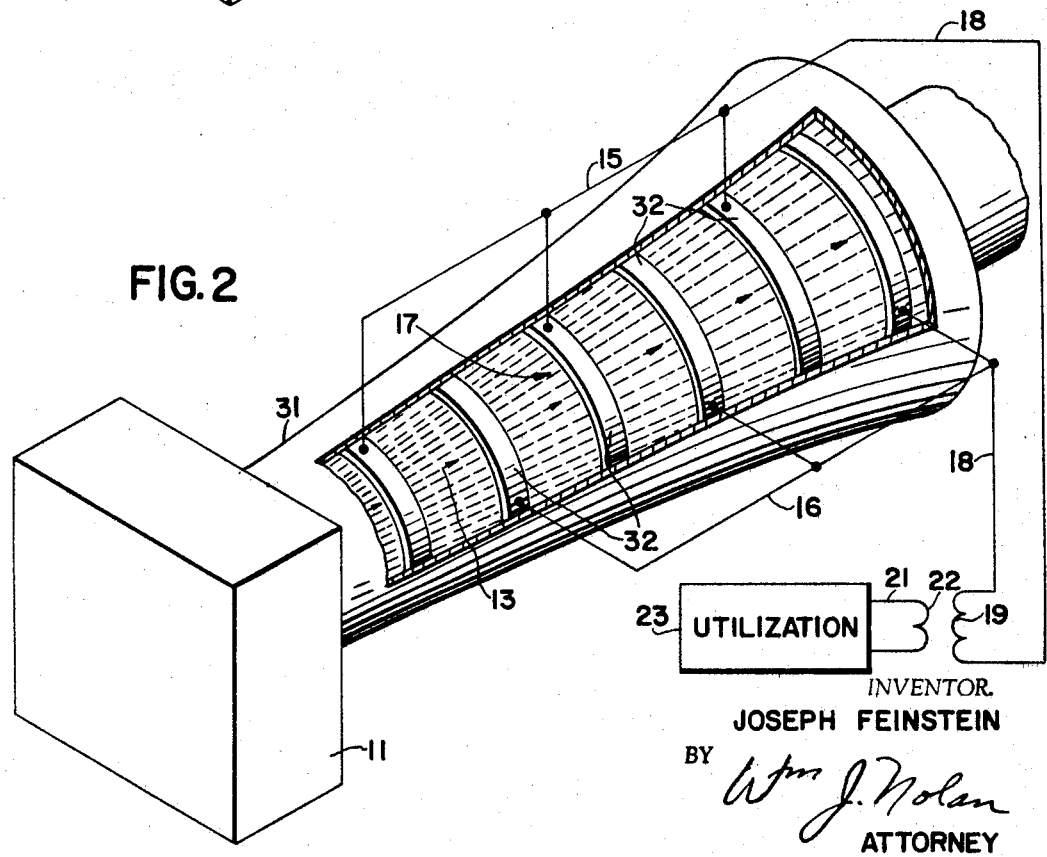
FIG. 2 is a schematic drawing, partly in cross-section, showing another preferred embodiment of the invention.

FIG. 2 shows another embodiment of the present invention with equivalent parts bearing the same reference numerals used in FIG. 1. This embodiment shows a nozzle shaped elongated duct 31. The cross sectional area of the passageway formed by the inner surface of conical duct 31 and the diameters of equally spaced circular electrodes 32 attached thereto increase uniformly in the flow direction of the gas stream 13. The increasing passageway size tends to increase the linear velocity of the gas stream 13 thus compensating for the retardation effect produced by interaction between the gas stream 13 and the traveling electric field wave. This flared nozzle arrangement affords an interaction that occurs simultaneously with the nozzle expansion. By suitable dimensioning of the elongated duct 31 a substantially constant stream velocity $u_0$ can be obtained through the entire passageway. This in turn insures the maintenance of synchronism and A.C. energy producing interaction along the entire duct length. Thus the nozzle form of the elongated duct 31 serves the same function as the reduced spacing of electrodes 14 shown in FIG. 1.

The operation of the embodiment shown in FIG. 2 is the same as that described above for the embodiment of FIG. 1.

Another important feature of the invention is the utilization of circular electrodes 14, 32 having an effective inner radius (R) which is less than its separation $L/2$ from an adjacent electrode. In this way a sufficient electric field strength can be maintained across the entire passageway surrounded by the electrodes and traversed by the gas stream 13. It should be noted that L represents the spacing between any individual alternate set of electrodes. Thus, L will be a variable in the embodiment shown in FIG. 1.

Figure 4:
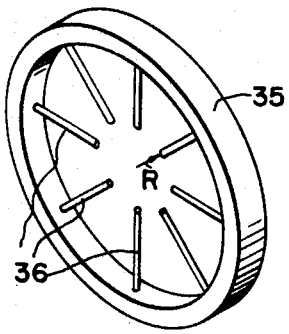
FIG. 4 shows a modified electrode for use with the invention embodiments of FIGS. 1 and 2.

FIG. 4 shows another electrode embodiment which can be used in certain applications to achieve the above relationship. This embodiment provides a circular electrode 35 having inward radial projections 36 which terminate short of the electrode center. The projections 36 in effect reduce the actual inner radius of the electrode 35 to a smaller electrically effective radius R. The electrode 35 with projections 36 can be used in certain applications to replace the electrodes 14 shown in FIG. 1 or the electrodes 32 shown in FIG. 2.

Figure 5:
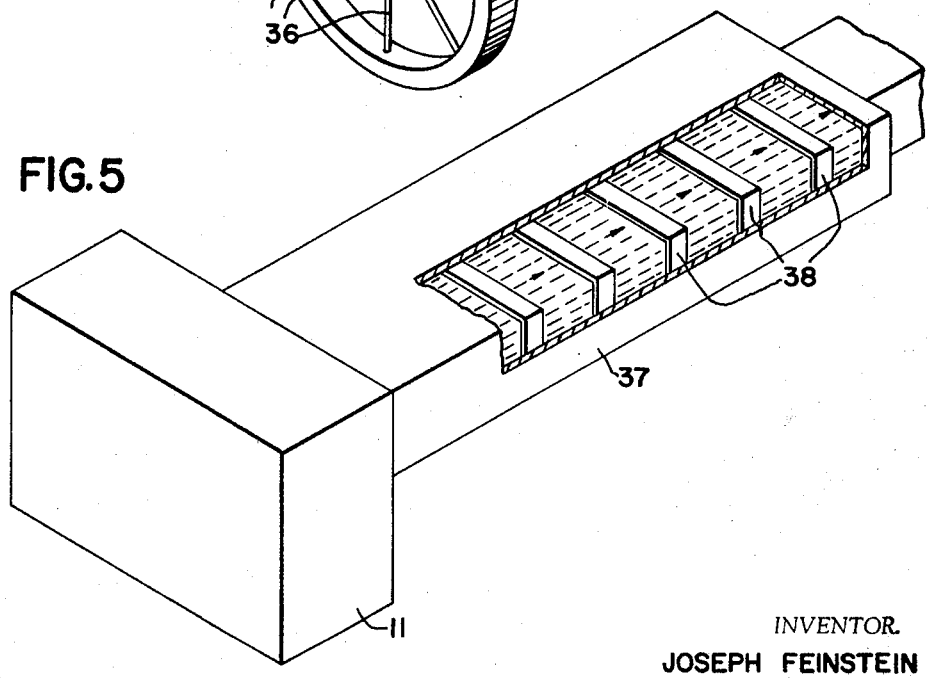
FIG. 5 is a schematic drawing, partly in cross-section, showing another embodiment of this invention.

FIG. 5 depicts another embodiment of the invention, wherein the duct 37 is rectangular, and supports rectangular strip electrodes 38 disposed adjacent to the inner surface of the duct 37. The associated circuitry has not been shown for convenience. This rectangular configuration affords a relatively large cross-section, yet does not experience electrode decoupling. Furthermore, such a geometry precludes the need for electrodes with projections as shown in FIG. 4, which projections penetrate the fluid stream and are thus subject to erosion.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:
1. A mass flow fluid generator for converting thermal energy to electrical energy and comprising, a fluid supply means adapted to produce a stream of high velocity electrically conductive fluid, a duct disposed downstream of said fluid supply means so as to form a longitudinal passageway for the fluid stream, synchronizing means associated with said duct and adapted to provide along the length thereof an electromagnetic wave supportive structure for interaction between the electric fields of wave energy on said wave supportive structure and the high velocity electrically conductive fluid stream so as to cause modulation and charge separation of the stream, and output means for receiving alternating current energy con- verted from the kinetic energy content of the modulated high velocity fluid stream passing through said duct.

2. A mass flow fluid generator according to claim 1 wherein said synchronizing means includes a traveling wave structure adapted to provide an electric field wave traveling longitudinally within said duct.

3. A mass flow fluid generator according to claim 2 wherein said traveling wave structure comprises a plurality of electrodes longitudinally spaced within said duct and including electrical conductor means alternately connecting said plurality of electrodes to form an interdigital array.

4. A mass flow fluid generator according to claim 3 including electrical inductance means connected to said interdigital array and wherein the electrical characteristics of said interdigital array and said inductance means are such as to provide an electrical circuit in parallel resonance at a frequency F in cycles per second which is slightly less than the value of $u_0/L$ where L represents the spacing in feet between particular alternate electrodes of said plurality of electrodes and $u_0$ represents the approximate velocity in feet per second of the fluid stream passing between said particular alternate electrodes.

5. A mass flow fluid generator according to claim 4 wherein said duct is formed of an electrical insulating material, said plurality of electrodes have an annular form and are mounted along the inner surface of said duct so as to surround the longitudinal passageway of the directed fluid stream.

6. A mass flow fluid generator according to claim 5 wherein said annular electrodes are circular in shape and wherein the given electrode between each pair of said alternate electrodes has an effective inner radius R in feet which is less than $L/2$.

7. A mass flow fluid generator according to claim 6 wherein the spacing between adjacent electrodes of said plurality of electrodes decreases in the intended flow direction of said fluid stream.

8. A mass flow fluid generator according to claim 6 wherein said circular electrodes include inward radial projections which reduce said effective inner radius R.

9. A mass flow fluid generator according to claim 7 wherein said circular electrodes include inward radial projections which reduce said effective inner radius R.

10. A mass flow fluid generator according to claim 3 wherein said duct is formed of an electrical insulating material, said plurality of electrodes have an annular form and are mounted along the inner surface of said duct so as to surround the longitudinal passageway of the directed fluid stream.

11. A mass flow fluid generator according to claim 10 wherein said annular electrodes are circular in shape and wherein the given electrode between each pair of said alternate electrodes has an effective inner radius R in feet which is less than $L/2$ where L represents the distance in feet between said particular alternate electrodes.

12. A mass flow fluid generator according to claim 11 wherein the spacing between adjacent electrodes of said plurality of electrodes decreases in the intended flow direction of said fluid stream.

13. A mass flow fluid generator according to claim 12 wherein said circular electrodes include inward radial projections which reduce said effective inner radius R.

14. A mass flow fluid generator according to claim 3, wherein said duct and said electrodes are rectangular.

15. A mass flow fluid generator for converting thermal energy to electrical energy and comprising, a fluid supply means adapted to produce a stream of high velocity electrically conductive fluid, an elongated duct disposed downstream of said fluid supply means and providing a longitudinal fluid stream passageway of uniformly increasing cross-section in the intended direction of fluid flow, synchronizing means associated with said duct and adapted to provide along the length thereof an electromagnetic wave supportive structure for interaction between the electric fields of wave energy on said wave supportive structure and the high velocity electrically conducted fluid stream so as to cause modulation and charge separation of the stream, and output means for receiving alternating current energy converted from the kinetic energy content of the modulated high velocity fluid stream passing through said duct.

16. A mass flow fluid generator according to claim 15 wherein said synchronizing means includes a traveling wave structure adapted to provide an electric field wave traveling longitudinally within said elongated duct.

17. A mass flow fluid generator according to claim 16 wherein said traveling wave structure comprises a plurality of electrodes longitudinally spaced within said elongated duct and including electrical conductor means alternately connecting said plurality of electrodes to form an interdigital array.

18. A mass flow fluid generator according to claim 17 including electrical inductance means connected to said interdigital array and wherein the electrical characteristics of said interdigital array and said inductance means are such as to provide an electrical circuit in parallel resonance at a frequency F in cycles per second which is slightly less than the value of $u_0/L$ where L represents the spacing in feet between particular alternate electrodes of said plurality of electrodes and $u_0$ represents the approximate anticipated velocity in feet per second of the fluid stream passing between said particular alternate electrodes.

19. A mass flow fluid generator according to claim 18 wherein said elongated duct is formed of an electrical insulating material, said plurality of electrodes have an annular form and are mounted along the inner surface of said elongated duct so as to surround the longitudinal passageway of the directed fluid stream.

20. A mass flow fluid generator according to claim 19 wherein said annular electrodes are circular in shape and wherein the given electrode between each pair of said alternate electrodes has an effective inner radius R in feet which is less than $L/2$.

21. A mass flow fluid generator according to claim 20 wherein said circular electrodes include inward radial projections which reduce said effective inner radius R.

References Cited

UNITED STATES PATENTS

| | | | |
|---|---|---|---|
| 3,095,163 | 4/1963 | Hill | 244—12 |
| 3,214,614 | 10/1965 | Maeder | 310—11 |

MILTON O. HIRSHFIELD, *Primary Examiner.*

DAVID X. SLINEY, *Examiner.*